US008752002B2

(12) United States Patent
Banavar et al.

(10) Patent No.: US 8,752,002 B2
(45) Date of Patent: Jun. 10, 2014

(54) AUTOMATICALLY GENERATING ARTIFACTS FOR SERVICE DELIVERY

(75) Inventors: Guruduth Somasekhara Banavar, Bangalore (IN); Ketki A. Dhanesha, Bengaluru (IN); Alan Hartman, Bengaluru (IN); Anshu N Jain, Bengaluru (IN); Inderpreet Thukral, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/608,228

(22) Filed: Oct. 29, 2009

(65) Prior Publication Data

US 2011/0107295 A1 May 5, 2011

(51) Int. Cl.
*G06F 9/44* (2006.01)

(52) U.S. Cl.
USPC ........................................... 717/104

(58) Field of Classification Search
USPC ........................................... 717/104
See application file for complete search history.

(56) References Cited

U.S. PATENT DOCUMENTS

| | | | |
|---|---|---|---|
| 6,898,629 B1 | 5/2005 | Hofkens et al. | |
| 7,178,104 B1 | 2/2007 | Harry et al. | |
| 7,197,740 B2* | 3/2007 | Beringer et al. | 717/108 |
| 7,219,327 B1* | 5/2007 | Jacobs et al. | 717/104 |
| 7,500,220 B1* | 3/2009 | Feng et al. | 717/106 |
| 7,657,542 B2* | 2/2010 | Sundararajan et al. | 717/103 |
| 8,069,435 B1* | 11/2011 | Lai | 717/106 |
| 8,234,650 B1* | 7/2012 | Eppstein et al. | 718/104 |
| 8,250,521 B2* | 8/2012 | Zhang et al. | 717/104 |
| 8,577,991 B2* | 11/2013 | Rehmann | 709/217 |
| 2004/0139176 A1* | 7/2004 | Farrell et al. | 709/220 |
| 2004/0167788 A1* | 8/2004 | Birimisa et al. | 705/1 |
| 2005/0235274 A1* | 10/2005 | Mamou et al. | 717/136 |
| 2007/0282659 A1 | 12/2007 | Bailey et al. | |
| 2007/0282692 A1 | 12/2007 | Bishop et al. | |
| 2008/0127047 A1* | 5/2008 | Zhang et al. | 717/104 |
| 2008/0250386 A1* | 10/2008 | Erl | 717/100 |
| 2008/0270201 A1 | 10/2008 | Flaxer et al. | |
| 2009/0013309 A1* | 1/2009 | Shavlik | 717/120 |
| 2009/0064087 A1* | 3/2009 | Isom | 717/101 |
| 2009/0313599 A1* | 12/2009 | Doddavula et al. | 717/102 |
| 2010/0115490 A1* | 5/2010 | Wilcock et al. | 717/104 |

FOREIGN PATENT DOCUMENTS

WO WO 2007/092232 A2 8/2007

OTHER PUBLICATIONS

Heckel et al., "Model-Based Development of Executable Business Processes for Web Services", 2004, Springer-Verlag, pp. 559-584.*
Spillner et al., "Distributed Contracting and Monitoring in the Internet of Services", 2009, IFIP, pp. 129-142.*
Desai et al., "Konark—A Service Discovery and Delivery Protocol for Ad-Hoc Networks", 2003, IEEE.*

(Continued)

*Primary Examiner* — Wei Zhen
*Assistant Examiner* — Junchun Wu
(74) *Attorney, Agent, or Firm* — Ryan, Mason & Lewis, LLP

(57) ABSTRACT

Techniques for generating one or more artifacts for service delivery are provided. The techniques include receiving one or more service design inputs, using the one or more service design inputs to generate an internal representation of the service design, using the internal representation of the service to generate one or more artifacts of the service, and incorporating the one or more artifacts into the service design and outputting the service.

19 Claims, 14 Drawing Sheets

(56) References Cited

OTHER PUBLICATIONS

Liu et al., "QoS Computation and Policing in Dynamic Web Service Selection", May 2004, ACM.*

Thukaral et al. (1995). The Technology of Service Design, IBM, New Jersey Institute of Technology and Rensselaer Polytechnic Institute.

Karlsen et al., (2007). Using SoDA to generate large documents in the Microsoft Word environment, Rational Edge.

McKeown et al., (1994). Practical Issues in Automatic Documentation Generation, ACM proceedings of the fourth conference on Applied Natural Language Processing.

Engle (2008). Automatic Document Generation: Can Computers Help to Generate Legal Memoranda? Social Science Research Network.

Leslie, (2002). Using javadoc and XML to produce API reference documentation, ACM Proceedings of the 20th Annual International Conference on Documentation.

Shostack, G. L. (1977), "Breaking free from product marketing" Journal of marketing, vol. 41, No. 2 (Apr. 1977), pp. 73-80.

Shostack, G. L. (1984), "Designing Services that Deliver," Harvard Business Review,62, 133-139.

Zeithaml et al. 1985. Problems and strategies in services marketing. Journal of Marketinig, Spring: 33-46.

Jin et al., Analysis on Service Level Agreement on Web Services, 2002.

* cited by examiner

FIG. 10

| METRIC | COMMENT |
|---|---|
| SOME EXAMPLES OF KEY PERFORMANCE AND QUALITY INDICATORS INFORMATION FOR MANAGERS. - IN CASE OF IT HIGHLY ENABLED SERVICES, PROVIDED THROUGH REAL TIME MANAGEMENT DASHBOARDS | |
| SERVICE NAME | e.g. MOBILE / LANDLINE |
| SERVICE TYPE | e.g. PREPAID / POSTPAID |
| SERVICE QUALITY | |
| UPTIME % | IDEAL 100% |
| VSAT % | IDEAL 100% DELIGHTED USERS |
| USABILITY % | INTUITIVE, EASE OF USE etc. |
| # SERVICE REQUESTS | SRs OUTSTANDING |
| SEV 'A' SR % | % SRs THAT ARE HIGH SEVERITY |
| SRs BY CATEGORY / TYPE / GEO | |
| # OF SUBSCRIBERS / CUSTOMERS | TOTAL CUSTOMER BASE |
| % ACTIVE USERS | CURRENT USERS AS % OF BASE |
| SERVICE USAGE BY TIME/DAY | USAGE PEAKS/TROUGHS |
| SERVICE USAGE BY EVENT | USAGE SPIKES DURING FESTIVALS, etc |
| SERVICE RECOVERY ANALYSIS | SR RESOLUTION TIME, EXCEPTIONS, etc |
| COMPETITIVE SUBSCRIBER WIN/LOSS | |
| COMPETITIVE PERCEPTION METRICS | |

AUTOMATICALLY GENERATING ARTIFACTS FOR SERVICE DELIVERY

FIELD OF THE INVENTION

Embodiments of the invention generally relate to information technology, and, more particularly, to service delivery.

BACKGROUND OF THE INVENTION

Service industry has achieved formal recognition only during the last few decades. A stark difference between service creation and goods creation is that services are produced at the time of delivery and they are co-produced with the customer being a contributor to the production, while goods are produced first and delivered later. This nature of service production necessitates the enablement mechanism for all parties involved: the customer, customer facing users, support users and systems, management functions, quality tracking mechanism, etc. A comprehensive set of service artifacts can be the enabler for a service delivery organization.

Services are also perishable and intangible. One cannot create a sample service and keep it for a future reference. Service once created, gets consumed and one can only learn from the reflection of that best practice incident.

Creation of service artifacts in isolation of one another may result in accidental quality achievement but not quality by design. Existing approaches of artifact generation, however, are not related to formal specification of service design or related artifacts.

SUMMARY OF THE INVENTION

Principles and embodiments of the invention provide techniques for automatically generating artifacts for service delivery.

An exemplary method (which may be computer-implemented) for generating one or more artifacts for service delivery, according to one aspect of the invention, can include steps of receiving one or more service design inputs, using the one or more service design inputs to generate an internal representation of the service design, using the internal representation of the service to generate one or more artifacts of the service, and incorporating the one or more artifacts into the service design and outputting the service.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 10 is a table illustrating examples of performance and quality indicator information for managers, according to an embodiment of the present invention;

DETAILED DESCRIPTION

Figure 1:
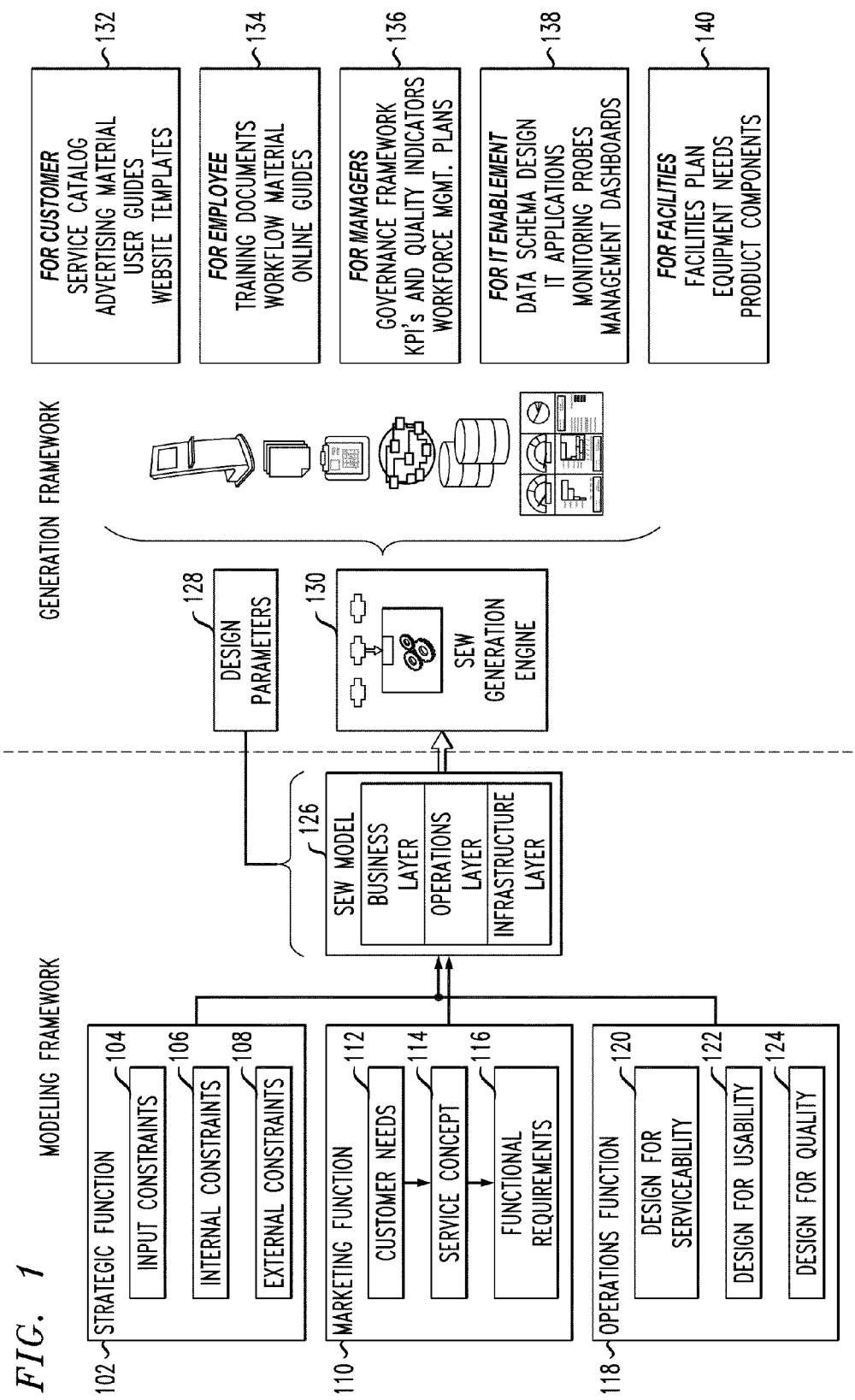
FIG. 1 is a diagram illustrating frameworks for generating artifacts for service delivery, according to an embodiment of the invention.

Principles of the invention include automatically generating artifacts for service delivery. The techniques detailed herein solve the gap between the design of services and the actual delivery of the services. As such, one or more embodiments of the invention include generating appropriate artifacts describing the enterprise, operational and customer related aspects of a service using a systematic service design methodology. The requirements and design elements can be structured in a formal model for service design that forms the core of the internal representation of a service. The internal representation can be used as input to a generation framework that can create and collate the service artifacts related to design, implementation and operation of a service.

As used herein, "services" indicated any act of delivering value to another (for example, a customer) by way of an intangible collaborative interaction.

One or more embodiments of the invention can include iterative techniques for capturing the requirements for a service in a systematic way so that the artifacts for service delivery may be generated. Such techniques can include, for example, capturing the market environment, enterprise requirements, user needs, and/or enterprise constraints in order to get a definition of the service offering which then can be used to generate an enterprise/business layer model. These steps can be iterated, for example, until a satisfactory enterprise layer model is attained.

The above-noted techniques can additionally include refining the enterprise layer model to produce a detailed description of the service elements, activities, actors, key performance indicators (KPIs), service level agreements (SLAs), and/or task flows. This enables the generation of the artifacts for customers, users (for example, employees), managers and information technology (IT) implementation professionals. One or more embodiments of the invention also include service on-boarding (that is, delivery), where the service is rolled out to users, as well as collecting feedback from customers, users, infrastructure elements (including IT resources) and/or management. The feedback can be used to iterate over the design models and artifacts described herein to set up a process of service management that incorporates evolution and improvement of the service implementation.

In contrast to the disadvantages of existing approaches, the techniques described herein include generating appropriate artifacts describing the business, operational and customer related aspects of a service delivery, as well as a software tool that automatically generates the artifacts of service design using an internal representation. In one or more embodiments of the invention, such artifacts are not necessarily needed by IT enablement software, but can be needed directly by roles involved in service delivery. Additionally, one or more embodiments of the invention enforce emerging service engineering concepts to create formal specification of enterprise services and thus create reusable assets for service delivery.

FIG. 1 is a diagram illustrating frameworks for generating artifacts for service delivery, according to an embodiment of the invention. By way of illustration, FIG. 1 depicts a modeling framework and a generation framework. The modeling framework includes a strategic function module 102, which includes input constraints 104, internal constraints 106 and external constraints 108. The modeling framework also includes a marketing function module 110, which includes customer needs 112, a service concept 114 and functional requirements 116. Additionally, the modeling framework includes an operations function module 118, which includes a design for serviceability 120, a design for usability 122 and a design for quality 124. The strategic function module 102, marketing function module 110 and operations function module 118 provide input to a service engineering workbench (SEW) model 126 (which includes a business layer, an operations layer and an infrastructure layer).

The generation framework includes a design parameters module 128 and a SEW generation engine 130, which interact with the SEW model 126. The SEW generation engine 130 receives input from a number of modules including a "for customer" module 132 (which includes service catalogs, advertising material, user guides, website templates, etc.), a "for employee" module 134 (which includes training documents, workflow material, online guides, etc.), a "for managers" module 136 (which includes governance framework, KPIs and quality indicators, workforce management plans, etc.), a "for IT enablement" module 138 (which includes data schema design, IT applications, monitoring probes, management dashboards, etc.), and a "for facilities" module 140 (which includes facilities plan, equipment needs, product components, etc.).

Figure 2:
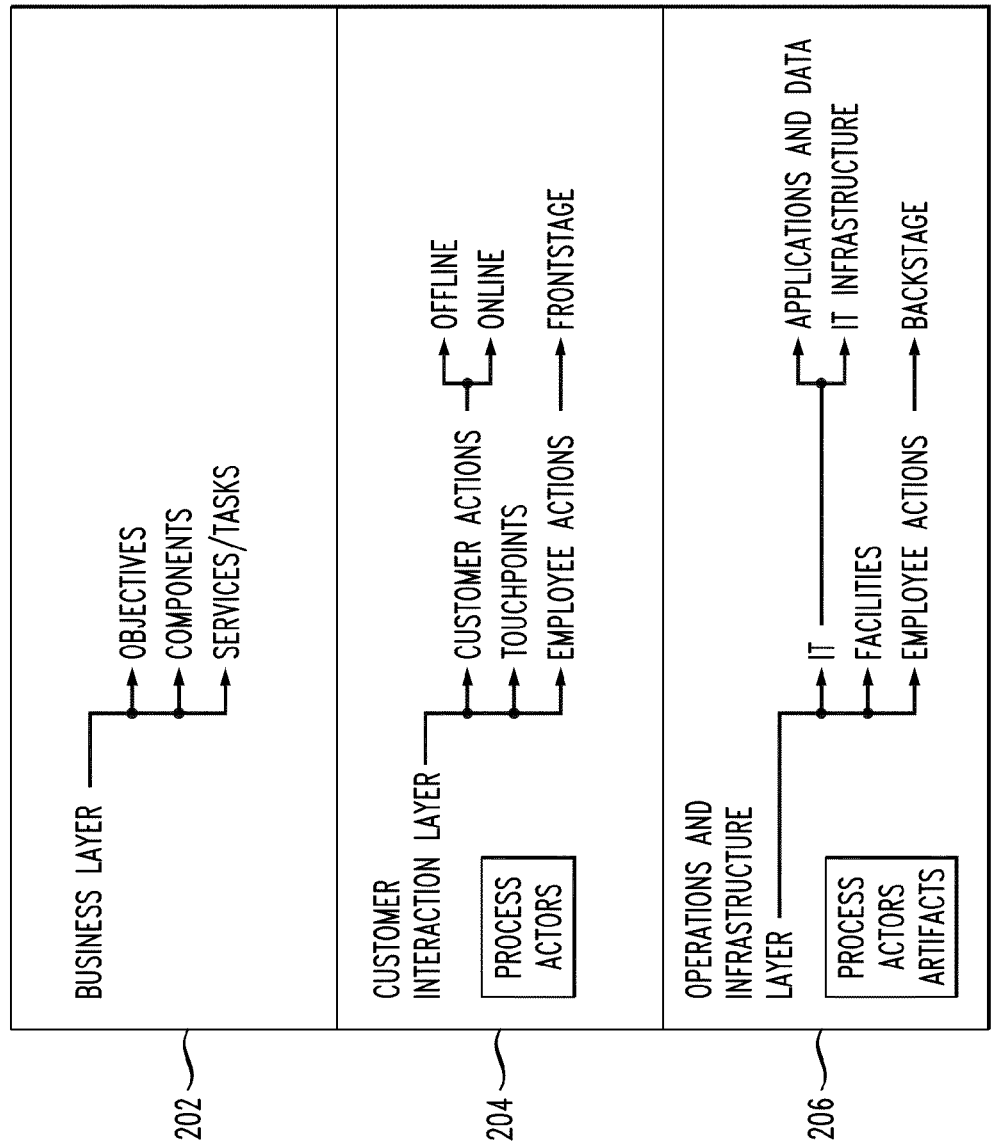
FIG. 2 is a diagram illustrating an internal representation (IR) of a business layer, a customer interaction layer and an operations and infrastructure layer, according to an embodiment of the present invention.

FIG. 2 is a diagram illustrating an internal representation (IR) of a business layer, a customer interaction layer and an operations and infrastructure layer, according to an embodiment of the present invention. By way of illustration, FIG. 2 depicts a business layer 202 (which includes objectives, components, services and tasks), a customer interaction layer 204 (which includes customer actions (online and offline), touchpoints and user actions (frontstage), and an operations and infrastructure layer 206 (which includes IT (applications, data, and IT infrastructure), facilities and user actions (backstage).

The business layer 202 can provide a formal definition to the parameters related to business strategy and marketing. This can include, for example, concepts, requirements, target markets, user needs, input constraints, etc. The business layer can also help to create a high-level definition of the business plan by creating high-level structure in terms of service components. This creates a skeleton for creating the detailed service delivery related artifacts (captured in the customer interaction, operations and infrastructure layer). Further, the business layer helps define the core service offering without jumping into the service tasks in detail, and can be captured in the concept phase of service design.

The customer interaction layer 204 can provide a formal definition to customers' interactions with the users, and the parameters related to the same. The representation is based on the distinction between various types of participants actions based on the exposure to the external world. For example, customer actions can include the participatory actions of customers in a service interaction, and frontstage user actions can include directly dealing with the customer, and creates the scope for defining interactions. Also, backstage user actions can include actions not directly interacting with the customer, but essential to the implementation of the core services. Support actions can include actions not directly related to delivery of the core services, but actions that are meant to support the overall infrastructure and operations in the above two categories.

The customer interaction layer also includes a touchpoint, an entity that signifies a medium of interaction between the service provider and service consumer. Additionally, the customer interaction layer captures the customer interaction aspects of delivery, and includes touchpoints to define interactions between customers and frontstage users.

The operations and infrastructure layer 206 can capture detailed design of individual tasks and service offerings derived from the concept. This layer can also capture, for example, day-to-day implementation details of all activities (processes), the normal flow as well as recovery flow of a process including process enablers, and elements such as resources, infrastructure, and facilities are defined in detail in this layer as well. The operations and infrastructure layer also serves as a bridge between the concept and the implementation of the service, and captures design of physical evidence involved in the service delivery process.

Additionally, as used herein, normal process flow indicates the functioning of a process when no upsets are encountered. Further, recovery process flow indicates the functioning of a process when the normal process has not been able to complete or is completed in a manner not compliant with service level agreements. The recovery process aims at redelivery of the desired service in a manner to win back the customer's satisfaction.

Figure 3:
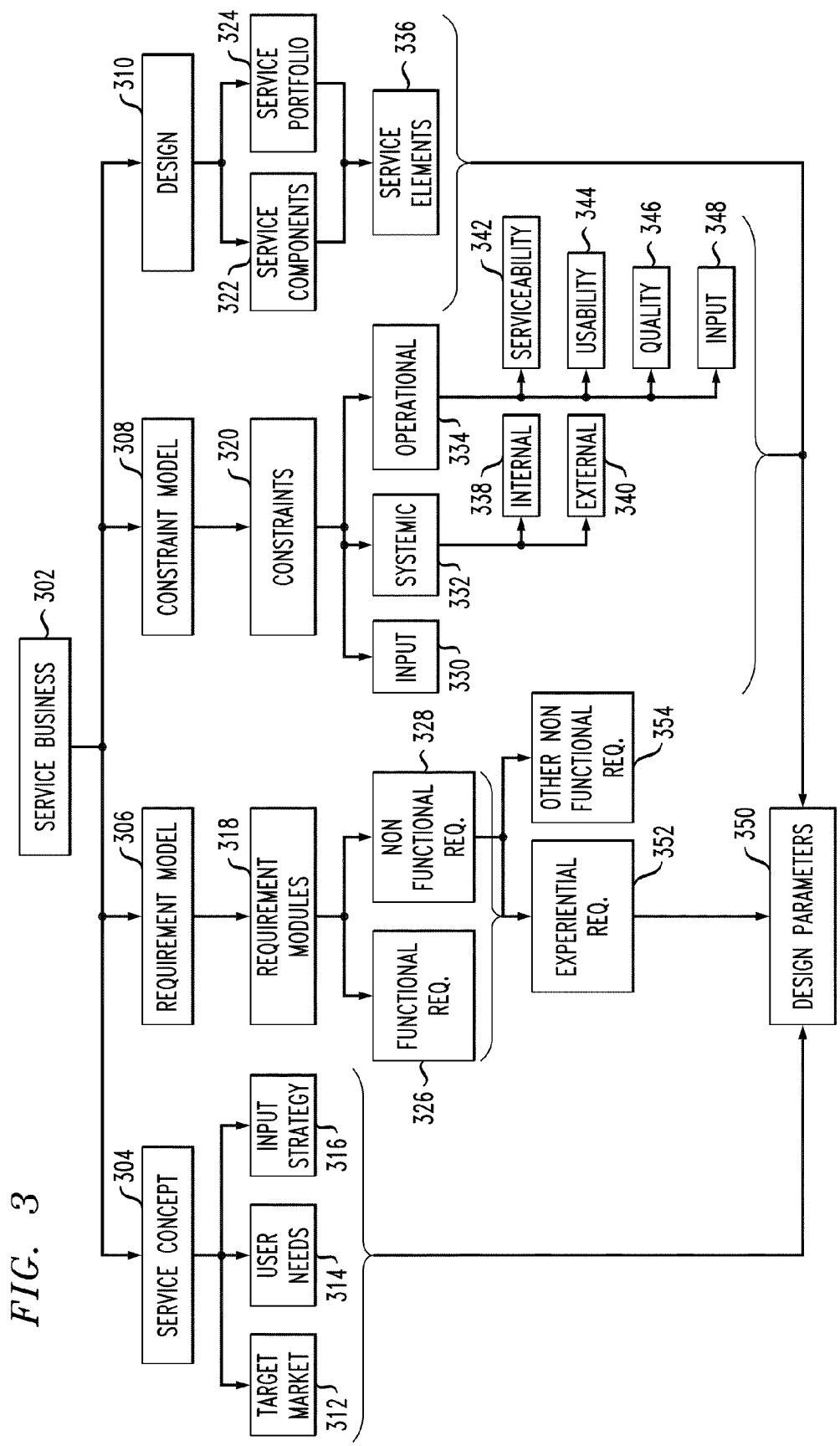
FIG. 3 is a diagram illustrating a business layer, according to an embodiment of the present invention.

FIG. 3 is a diagram illustrating a business layer, according to an embodiment of the present invention. By way of illustration, FIG. 3 depicts a service business component 302, which provides input to service concept component 304, requirement model component 306, constraint component 308 and design component 310. The service concept component 304 provides input to a target market component 312, a user needs component 314 and an input strategy component 316, which all provide input a design parameters component 350.

The requirement model component 306 provides input to requirement modules component 318, which provides input to functional requirement component 326 and non-functional requirement component 328, which provide input to experiential requirement component 352 and other non-functional requirement component 354, which then provide input to the design parameters component 350.

The constraint model component 308 provides input to a constraints component 320, which provides input to an input component 330, a systemic component 332 and an operational component 334. The systemic component 332 provides input to an internal component 338 and an external component 340, while the operational component 334 provides input to a serviceability component 342, a usability component 344, a quality component 346 and an input component 348, all of which provide input to the design parameters component 350.

Also, the design component 310 provides input to a service components component 322 and a service portfolio component 324, which provide input to a service elements component 336, which then provides input to the design parameters component 350.

Figure 4:
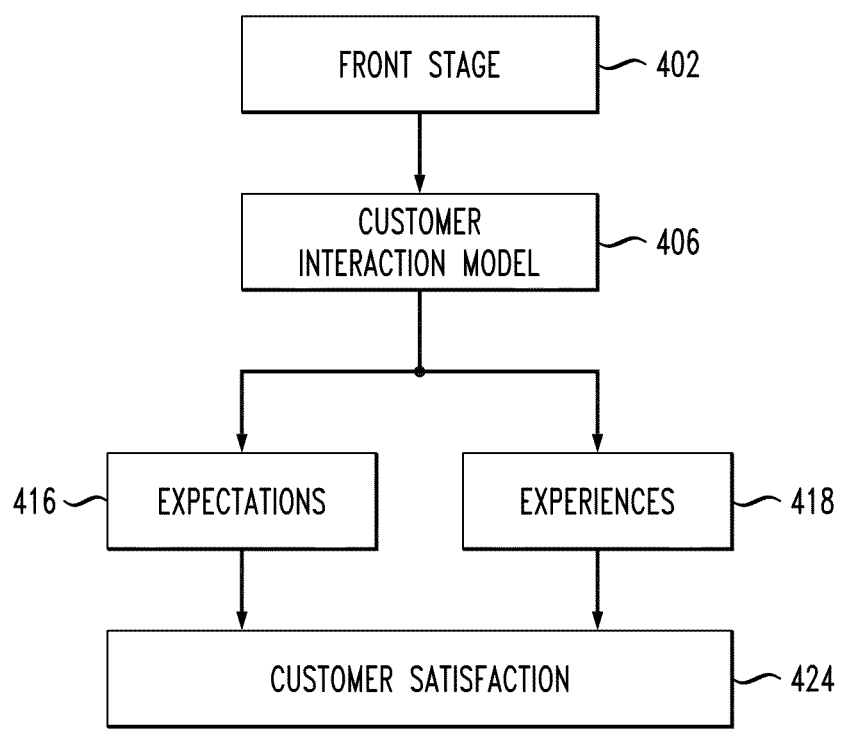
FIG. 4 is a diagram illustrating a customer interaction layer, according to an embodiment of the present invention.

FIG. 4 is a diagram illustrating a customer interaction layer, according to an embodiment of the present invention. By way of illustration, FIG. 4 depicts the details of the front-stage component 402, which provides input to a customer interaction model component 406. By way of illustration, the customer interaction model component 406 includes two models of the customer expectations 416 and the customer experiences model 418, each of which feeds into a customer satisfaction model 424.

Figure 5:
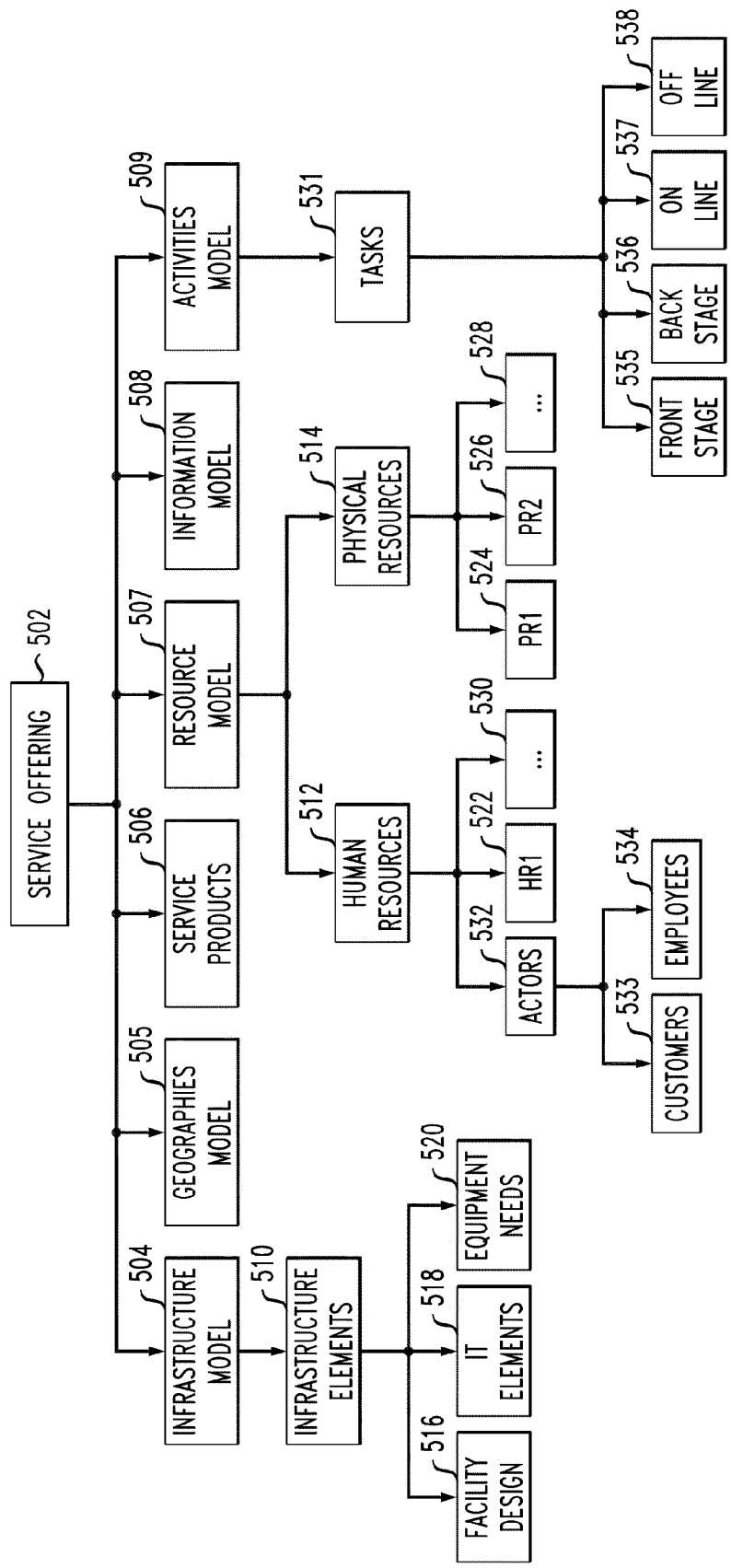
FIG. 5 is a diagram illustrating an operations and infrastructure layer, according to an embodiment of the present invention.

FIG. 5 is a diagram illustrating an operations and infrastructure layer, according to an embodiment of the present invention. By way of illustration, FIG. 5 depicts a service offering component 502, which provides input to an infrastructure model component 504, a geographies model component 505, an activities model component 509, a services products component 506, a resource model component 507 and an information model component 508. The infrastructure model component 504 provides input to an infrastructure elements component 510, which then provides input to a facility design component 516, an IT elements component 518 and an equipment needs component 520.

The activities model component 509 provides input to a tasks component 531, which provides input to a frontstage component 535, a backstage component 536, an online component 537 and an offline component 538. Additionally, the resource model component 507 provides input to a human resources component 512 and a physical resources component 514. The human resource model component 512 provides input to an actors component 532, which provides input to a customers component 533 and an employees component 534. The human resource model component 512 also has provision to be extended by various other components which are specialized forms of human resource components. This is represented by the components 522 and 530. Similarly, the physical resource component 514 can be extended by various specialized forms of resources represented by components 524, 526, 528.

Figure 6:
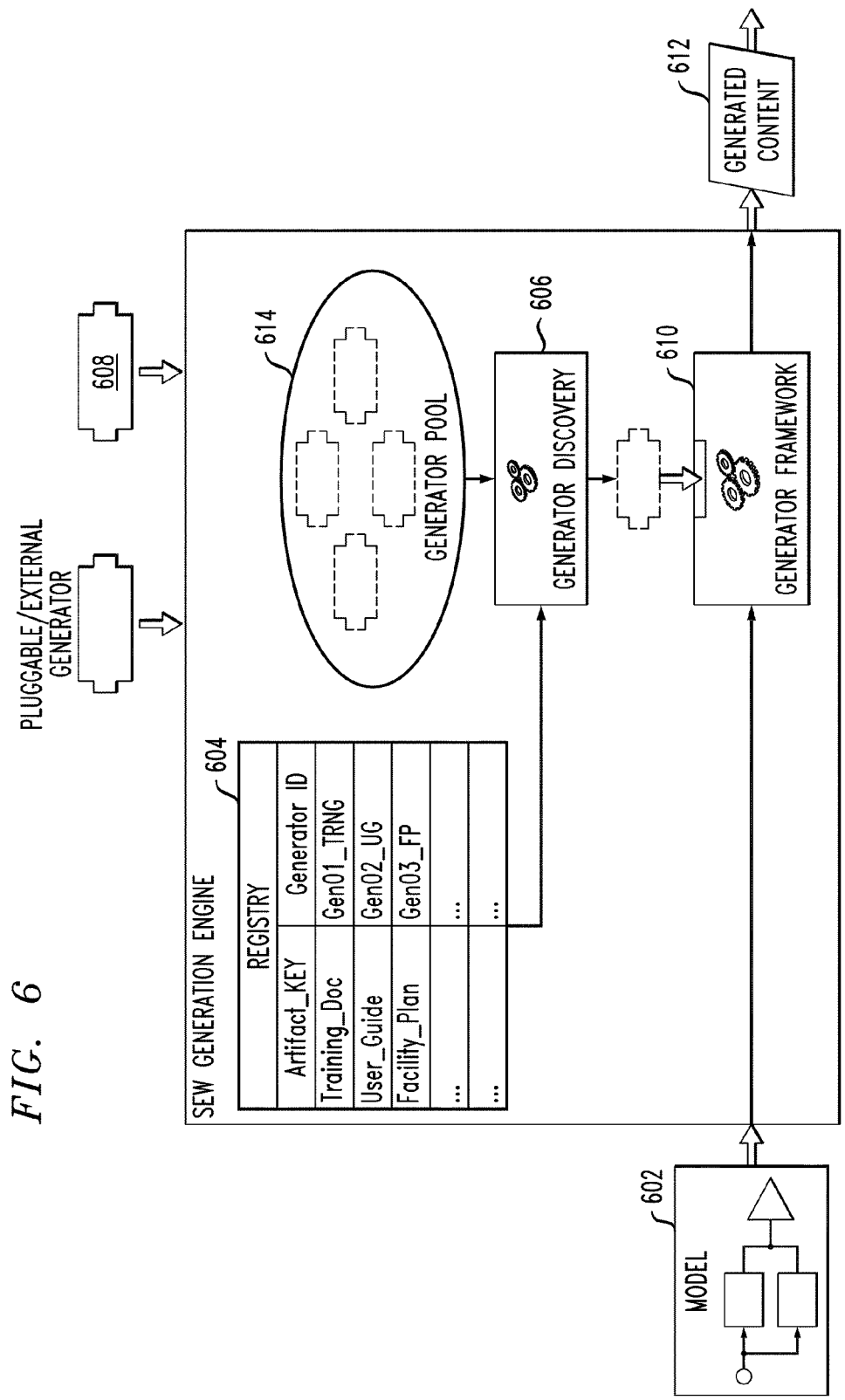
FIG. 6 is a diagram illustrating a service engineering workbench (SEW) generator, according to an embodiment of the present invention.

FIG. 6 is a diagram illustrating a SEW generator, according to an embodiment of the present invention. By way of illustration, FIG. 6 depicts a model 602, which provides input to the SEW generation engine. The engine includes a registry 604 and a generator pool 614, which both provide input to a generator discovery component 606, which provides input to a generator framework 610, which then provides generate content 612. The generator framework 610 also helps in managing multiple generators for multiple types of artifacts. Additionally, FIG. 6 depicts pluggable and/or external generators 608, which can provide input to the SEW generation engine.

As illustrated by FIG. 6, the registry 604 is used for registering generators for various types of artifacts. The discovery module 606 inspects the registry to find out the various generators corresponding to the requested generator, and then retrieves the corresponding generator from the generator pool 614. A retrieved generator 608 is invoked by the generation framework by passing the model 602 to the same, and the output of the generation 612 is the required artifact.

Figure 7:
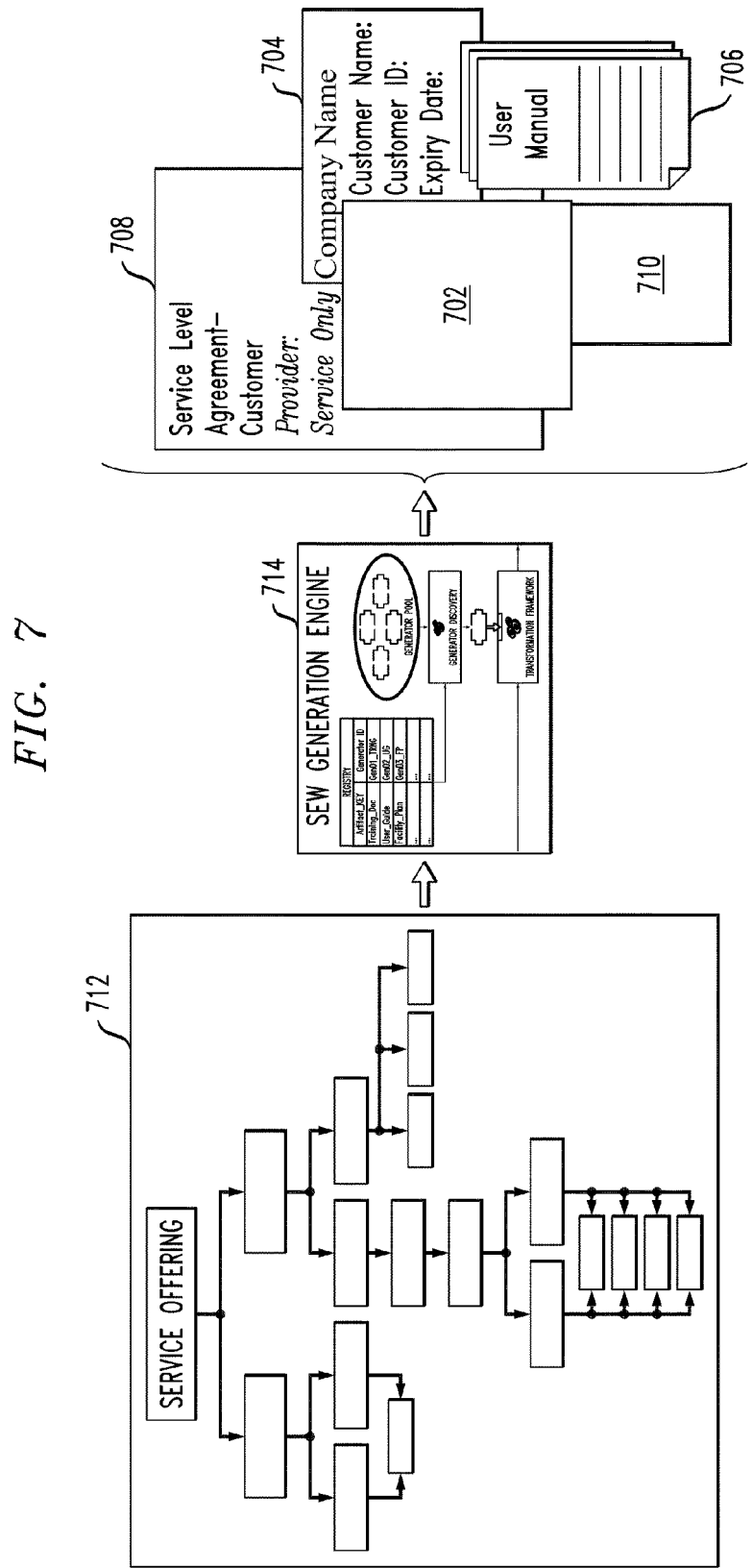
FIG. 7 is a diagram illustrating customer artifacts, according to an embodiment of the present invention.

FIG. 7 is a diagram illustrating customer artifacts, according to an embodiment of the present invention. One or more embodiments of the invention can generate tangibles that can be handed over to the customers and relevant counterparts can also be produced for service providers for tracking purposes. By way of illustration, FIG. 7 depicts a customer related model 712 as input to the SEW generation engine 714 which produces customer artifacts specific to the service offering. These artifacts function as tangible evidence of subscribed service(s). Exemplary illustrations of the artifacts can include, for example, service catalogs 702, membership card templates 704, user guides/manuals 706, service level agreements (SLAs) for individual customers 708, monitoring/feedback cards 710, service enrollment forms, other service information aids depending upon the nature of service, etc.

The feedback card will be cognizant of user intensive nature of services and can be made intuitive and easy. It will give the customer a sense of control while enabling the feedback mechanism for quality control measures. Additionally, customer invoice templates can include a way for the customer to keep track of purchased items or services, and can also include a service level agreement. A customer receipt or proof of payment received can be, for example, a regular receipt with a reference to an invoice or it can be a ticket that allows the customer to claim the service or product. Examples of such receipts could include, for instance, a ticket to watch a movie at a cinema hall, a ticket for bus or air travel, etc.

Figure 8:
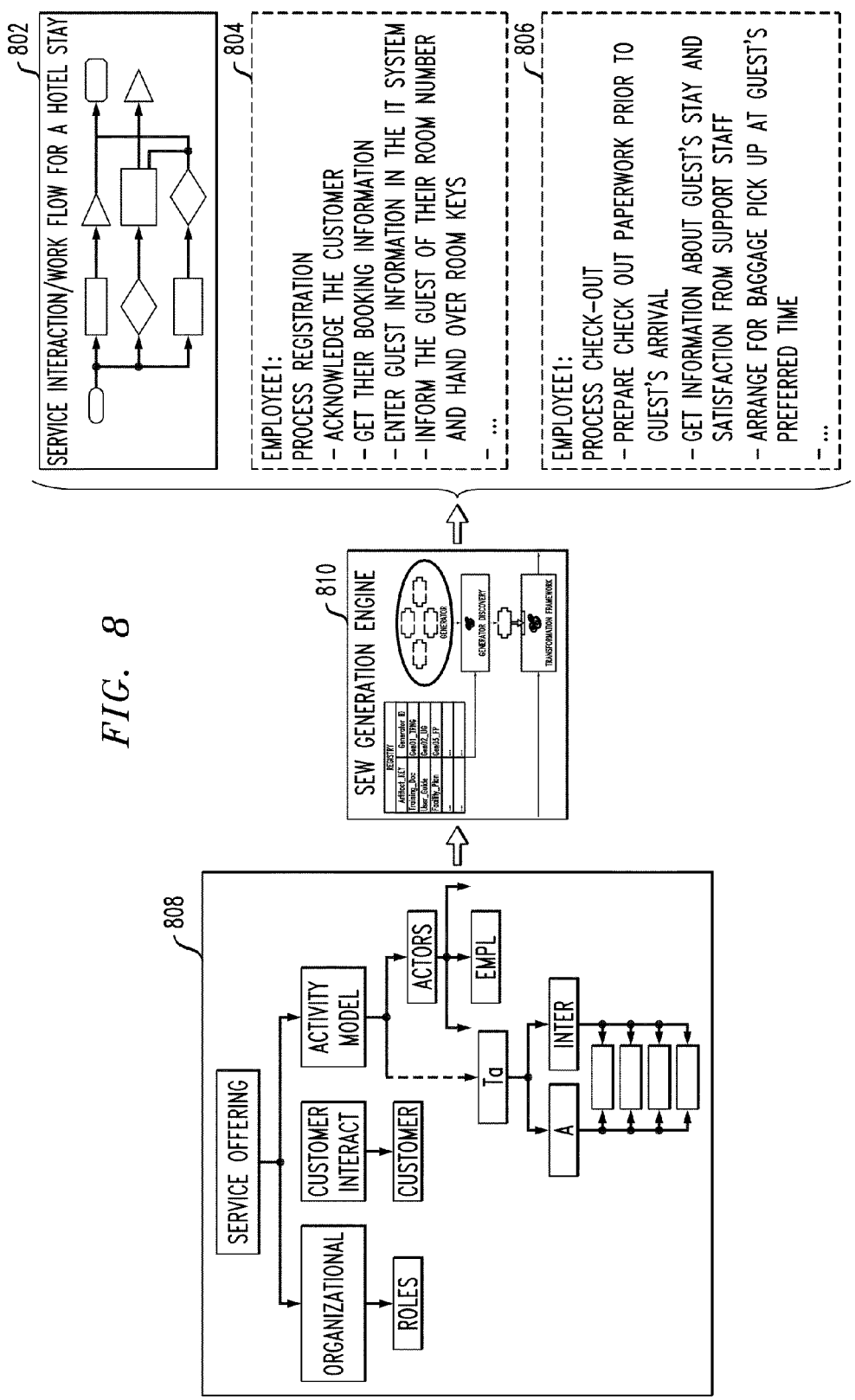
FIG. 8 is a diagram illustrating user artifacts, according to an embodiment of the present invention.

FIG. 8 is a diagram illustrating user artifacts, according to an embodiment of the present invention. One or more embodiments of the invention can generate tangibles that can be handed over to the users. By way of illustration, FIG. 8 depicts a user related model 808 as input to the SEW generation engine 810 which will produce the user artifacts specific to the task responsibilities for all users for the entire service offering. These artifacts support and empower users to deliver high quality service. FIG. 8 illustrates generation of workflow artifacts, and examples of user artifacts can include, for instance, detailed steps or appropriate guidelines for user tasks (depicted in items 804 and 806), an understanding of an user's area of influence (depicted in item 802), etc.

A SEW generation engine can also create a process flow for users. The process flow will be the one that includes the user's task. By having the larger picture through process flow, an user can understand his or her situation in the service chain and be informed about the dependencies between people and tasks. Also, conduct guidelines can include, by way of example, overall service vision, company policies, etc. Additionally, job aids can include training such as customer interaction related soft skills training for customer facing users as well as IT training. Job aids can also include training material and/or manuals online (supporting IT application) and offline (user interaction guides), as well as task-related information during service delivery mode. One or more embodiments of the invention can also include specifications of brand image artifacts (if applicable) such as uniforms, badges, identification cards, etc.

Figure 9:
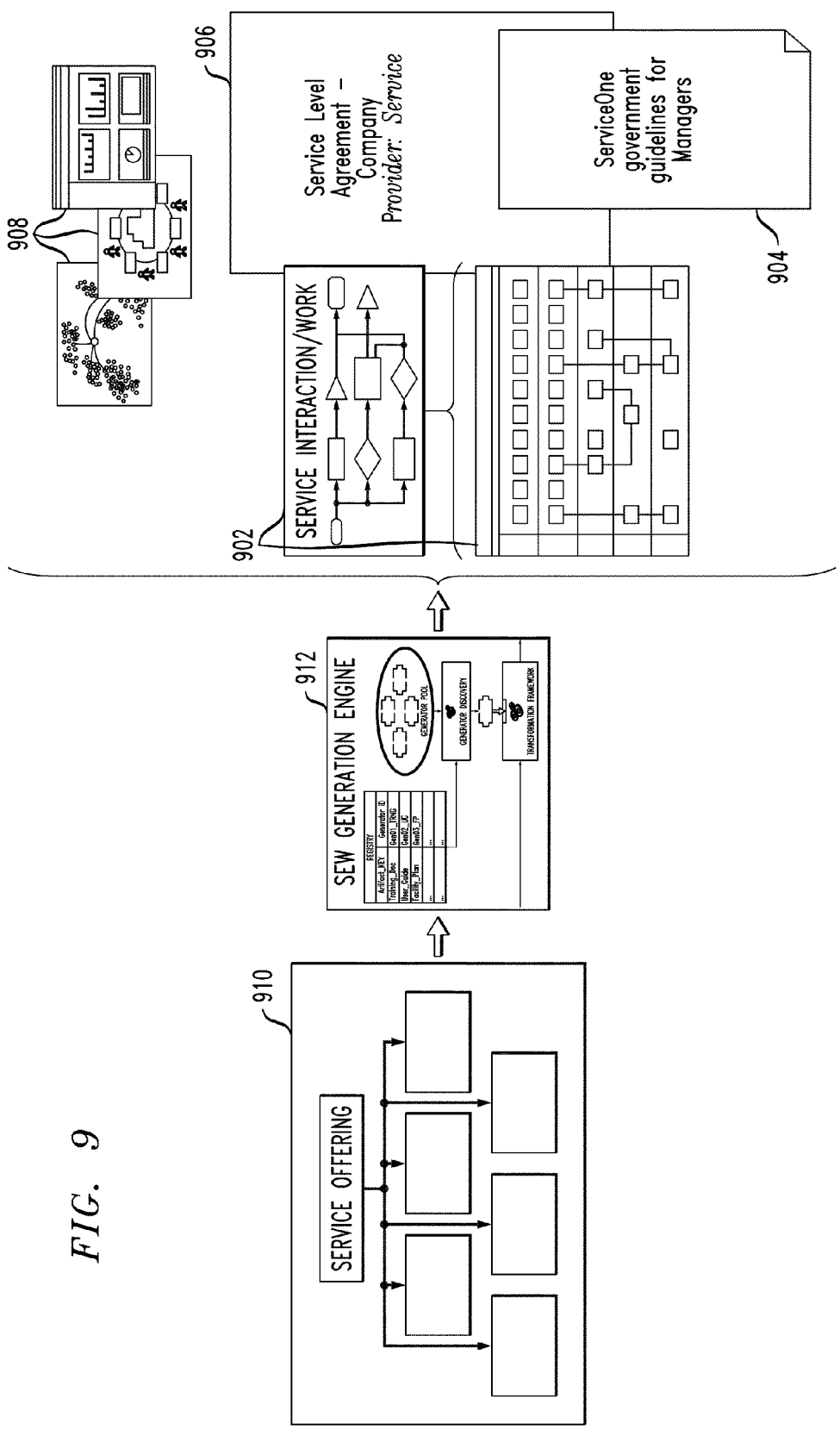
FIG. 9 is a diagram illustrating manager artifacts, according to an embodiment of the present invention.

FIG. 9 is a diagram illustrating manager artifacts, according to an embodiment of the present invention. One or more embodiments of the invention can generate tangibles for managed responsibilities. By way of illustration, FIG. 9 depicts a managed processes related model as input to the SEW generation engine 912 from an infrastructure layer 910 produces the management artifacts specific to processes for all service elements as well as locations for the entire service offering. These artifacts support and empower management of high quality services. FIG. 9 illustrates generation of governance framework, key performance and quality indicators (on dashboard), workforce mgmt. plans, etc.

Examples of manager artifacts can include, for instance, SLAs at applicable levels of granularity 906. For executive managers, the SLAs could be overall SLAs between two organizations, while for front line managers, the SLAs could be SLA pertaining to their area of influence (that is, SLAs pertaining to local branch of client organization).

Manager artifacts can also include, by way of example, workflows for a managed area 902, management guidelines 904, management dashboards 908, a workforce management plan, quality indicators, governance framework, policy statements, reference artifacts, etc. Further, reference artifacts can include a set of customer artifacts for reference, as well as a set of user artifacts for reference for all user types.

Figure 11:
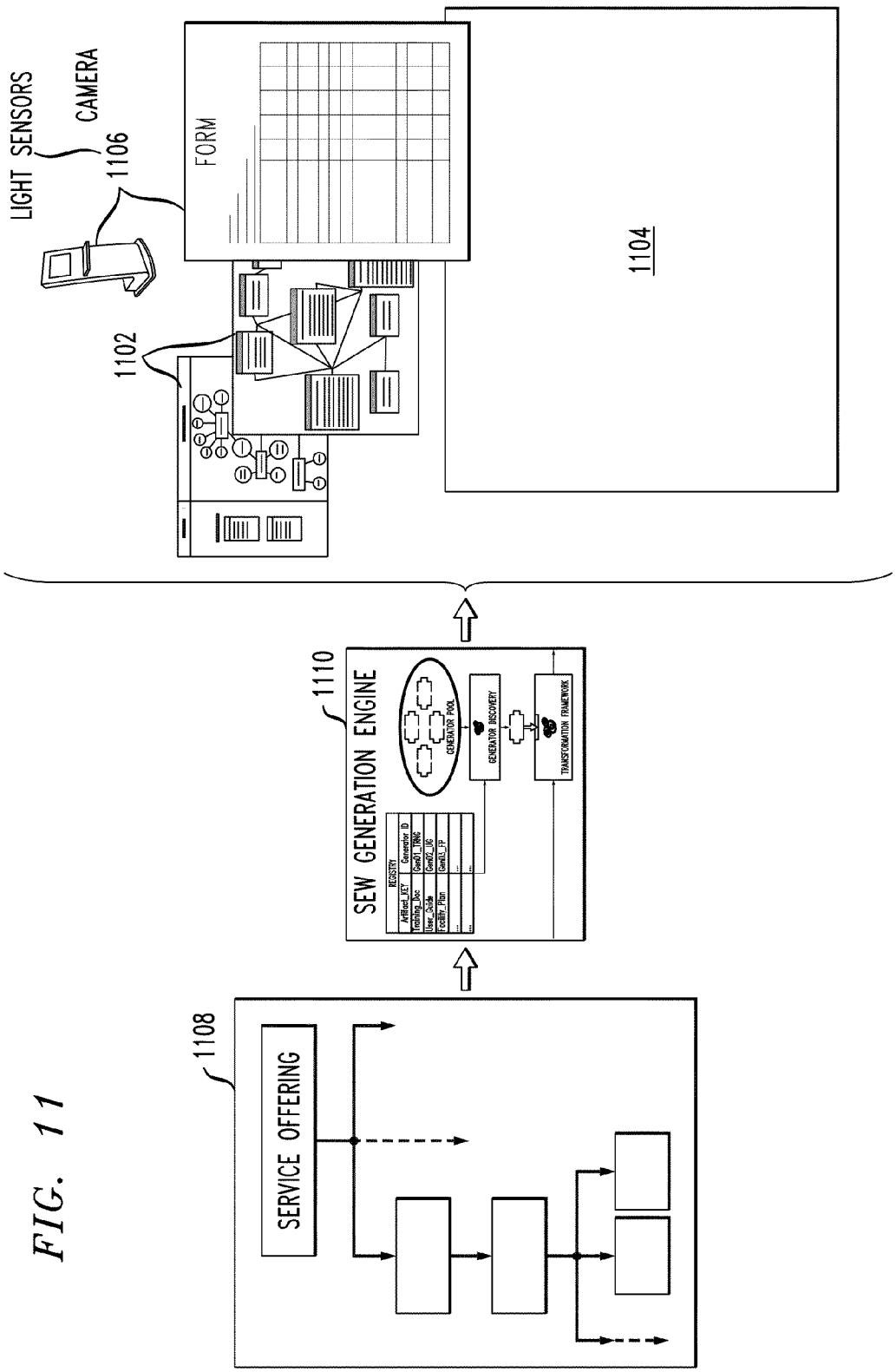
FIG. 11 is a diagram illustrating information technology (IT) support artifacts, according to an embodiment of the present invention.

FIG. 10 is a table 1002 illustrating examples of performance and quality indicator information for managers, according to an embodiment of the present invention. Additionally, FIG. 11 is a diagram illustrating information technology (IT) support artifacts, according to an embodiment of the present invention. One or more embodiments of the invention can generate specifications of an underlying IT system to support the service operations.

By way of illustration, FIG. 11 depicts as IT Infrastructure model as input to the SEW generation engine 1110 from an operations and infrastructure layer 1108 produces the IT artifacts or specifications of IT artifacts that will enable entire service operation. The look and feel of the IT user interfaces can be maintained in keeping with the brand policy which will provide seamless feel to the entire service regardless of mode of service delivery, both online and in person. Examples of IT support artifacts can include, for instance, specifications for IT applications. A SEW generation engine can create specifications for an IT application to enable end-to-end service offering. The level of sophistication will be determined by the IT enablement policy of the service provider as well as requirements and constraints as captured in the model.

IT support artifacts can also include data schema design 1102, which can be created by the SEW engine and can be used during IT application design. Additionally, IT support artifacts can include user interface templates 1104. An IT user interface for customers can include, for example, web site templates, and a user interface for service providers can include, for example, application user interface templates, management dashboards, etc.

Further, IT support artifacts can also include monitoring probes 1106. In case of end-to-end IT enabled services, a SEW generation engine can create service monitoring probes which can be used to receive feedback from the customers as well as automatic measurement of equipment status. The input from theses probes can be fed to management dashboards for quality assurance purposes. These probes can be feedback forms, paper-based, web-based or kiosks, various environment sensors (for example, light sensors), camera in public areas, etc.

Additionally, IT support artifacts can include an IT infrastructure plan. The SEW engine can plan for needed IT equipment such as servers, networking equipment, personal computers, kiosks, etc. The space, power, as well as connection needs for this equipment can also be planned and made available to relevant agencies.

Figure 12:
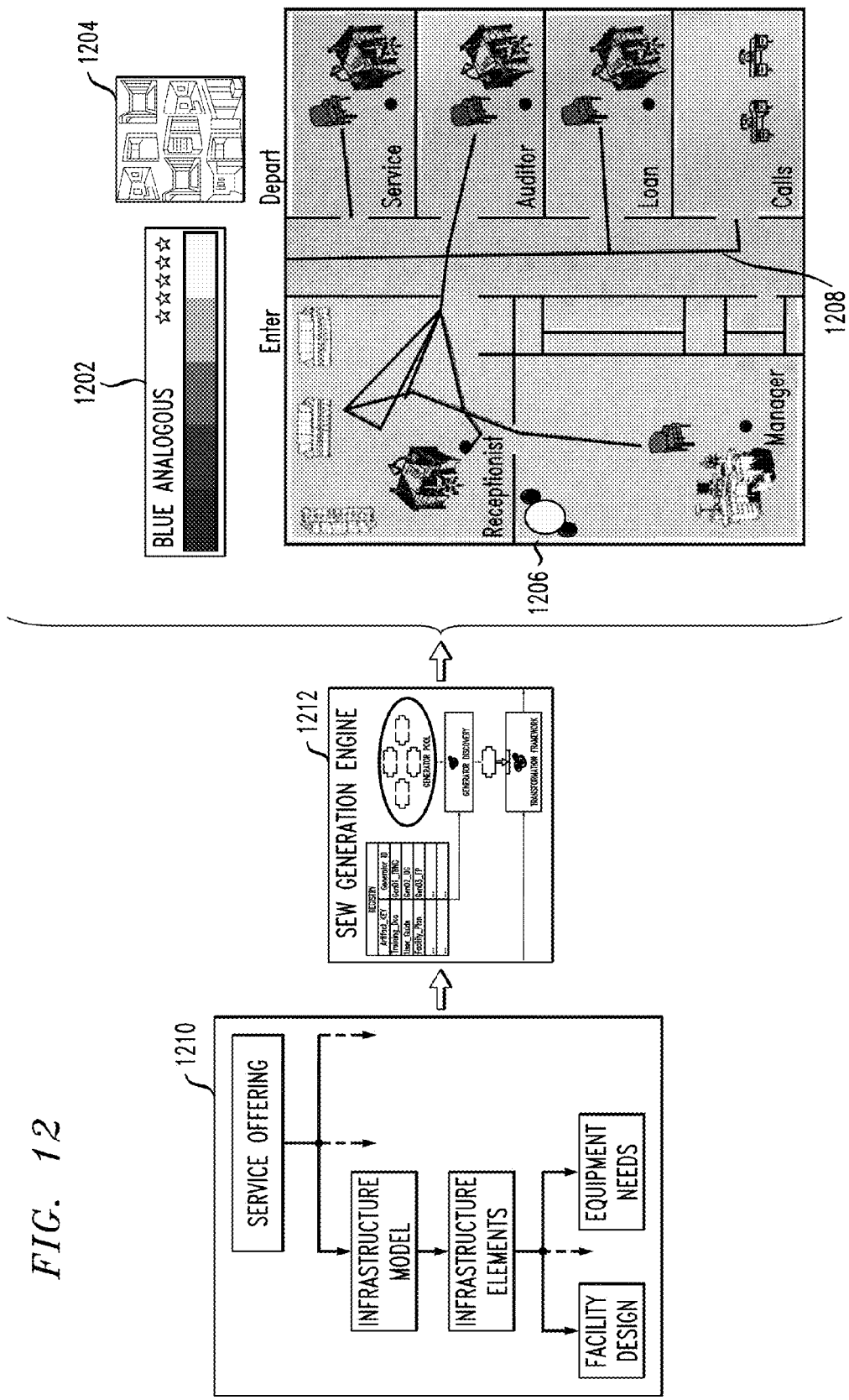
FIG. 12 is a diagram illustrating physical infrastructure artifacts, according to an embodiment of the present invention.

FIG. 12 is a diagram illustrating physical infrastructure artifacts, according to an embodiment of the present invention. One or more embodiments of the invention can generate specifications for physical infrastructure. The specifications can be used, for example, for development and maintenance purposes. By way of illustration, a SEW generation engine 1212 can accept an infrastructure model 1210 as input and produce the specification for infrastructure artifacts specific to the service offering.

Exemplary infrastructure artifact specifications can include, for instance, brand image guidelines for facilities such as brand policies, a brand color scheme 1202 and a brand space management scheme. Infrastructure artifact specifications can also include a facilities plan 1206 that includes a portfolio containing, for example, a facilities architectural plan, a facilities exterior plan 1204 and a facilities interior plan (a display area, a foot flow area 1208, an IT equipment area, a power equipment area, a utility area, etc.). Further, infrastructure artifact specifications also include a facilities management plan.

As illustrated in FIG. 12, specifically components 1206 and 1208, the directional boards for different areas such as "service," "calls," "auditor," "manager," and "secretary" make it easier for customers to determine which desk to approach for what service. Additionally, one or more embodiments of the invention include creating an information plan for the facilities corresponding to activities and the facilities (physical and/or virtual) plan. The information can be used, for example, to guide customers through the facilities for people-intensive services. The information can include physical signage, virtual display, maps, etc, and the model can be input and artifact can be output from the SEW generation engine.

Figure 13:
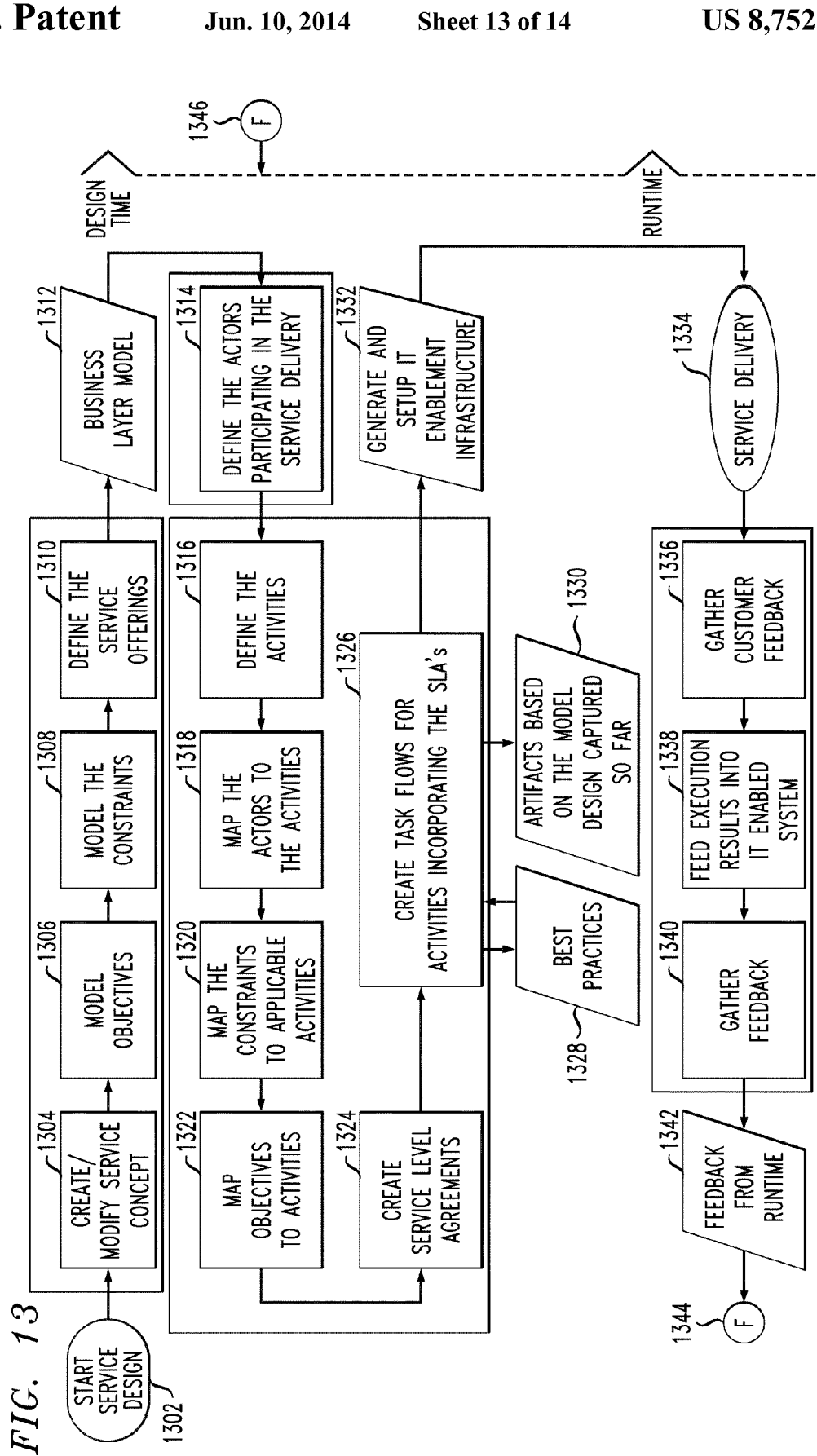
FIG. 13 is a flow diagram illustrating an iterative process for capturing the requirements for a service in a systematic way so that the artifacts for service delivery may be generated, according to an embodiment of the present invention.

FIG. 13 is a flow diagram illustrating an iterative process for capturing the requirements for a service in a systematic way so that the artifacts for service delivery may be generated, according to an embodiment of the present invention. Step 1302 includes starting service design. The first set of steps captures the market environment, business requirements, user needs, and business constraints in order to get a definition of the service offering which then can be used to generate the business layer model. These steps are not necessarily carried out in the order described in the diagram, but are iterated until a satisfactory business layer model is attained.

For example, step 1304 includes creating and/or modifying a service concept. Step 1306 includes modeling objectives. Step 1308 includes modeling constraints. Step 1310 includes defining the service offerings. Additionally, step 1312 includes attaining a business layer model. The market environment serves to focus the designer's attention to defining user profiles in the target market, and specifying the specific needs of users in the target market. The business requirements include such elements as desired profitability goals, target activation time for the service, etc. Further, the business constraints include availability of resources (physical, human, software, capital, external services, etc.).

The next set of steps refines the business layer model to produce a detailed description of the service elements, activities, actors, KPIs, SLAs, and task flows. This enables the generation of the artifacts for customers, users, managers and IT implementation professionals. These steps are not necessarily carried out in the order described in the diagram.

For example, step 1314 includes defining the actors participating in the service delivery. Step 1316 includes defining the activities. Step 1318 includes mapping the actors to the activities. Step 1320 includes mapping the constraints to applicable activities. Step 1322 includes mapping objectives to activities. Step 1324 includes creating SLAs. Step 1326 includes creating task flows for activities incorporating the SLAs (as well as incorporating best practices in step 1328). Step 1330 includes generating artifacts based on the model design captured to this point, and step 1332 includes generating and setting-up IT enablement infrastructure.

The definition of actors includes all customer roles, users, managers, and external providers of service and information necessary for the service delivery. Each of the actors participates in a set of activities which are subject to the business constraints. The activities are combined into a process flow which determines the choreography of the service. The process flow is based on an existing set of best practices, and the new processes may be contributed to the database of best practices for further re-use in later service design activities.

At various points in the process flow, service levels can be set from the business requirements, user needs, and business constraints. Also, at various points in the process flow, observations of the key performance indicators can be flagged. Further, as illustrated in the figure, the IT enablement infrastructure can be generated so that IT professionals may flesh out the software (SW) needed for the service delivery.

The next stage is one of service onboarding (delivery), where the service is rolled out to users as depicted in step 1334. Additionally, the final steady state of the service delivery involves the collection of feedback from customers, users, infrastructure elements (including IT resources) and management. For example, step 1336 includes gathering customer feedback. Step 1338 includes feeding implementation results into the IT-enabled system. Step 1340 includes gathering feedback, and step 1342 includes outputting feedback from run-time. The feedback is used to iterate over the design models and artifacts described above to set-up a process of service management which incorporates evolution and improvement of the service implementation. Items 1344 and 1346 (the circled "Fs") represent the feedback loop closing from the lower part back to the other upper part of the flow chart.

Figure 14:
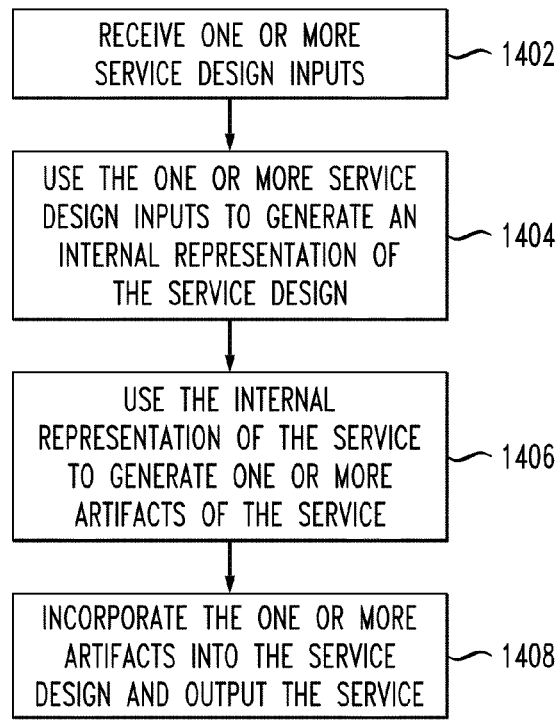
FIG. 14 is a flow diagram illustrating techniques for generating one or more artifacts for service delivery, according to an embodiment of the invention.

FIG. 14 is a flow diagram illustrating techniques for generating one or more artifacts for service delivery, according to an embodiment of the present invention. Step 1402 includes receiving one or more service design inputs. The service design inputs can include, for example, customer needs, business objectives, constraints (for example, pricing), customer activities and/or provider activities.

Step 1404 includes using the one or more service design inputs to generate an internal representation of the service design. Using the service design inputs to generate an internal representation of the service design can include using a service design tool to build the internal representation from the service design inputs.

Step 1406 includes using the internal representation of the service to generate one or more artifacts of the service. Using the internal representation of the service to generate artifacts of the service can include using a software tool to automatically generate the artifacts of service design.

The artifacts of the service can include, for example, artifacts for customers, artifacts for users, artifacts for managers, artifacts for information technology (IT) enablement and/or physical artifacts. Artifacts for customers can include, for example, a service catalog, advertising material, a user guide for customers and/or one or more website templates. Artifacts for users can include, for example, one or more workflows, training material, and/or online guides. Artifacts for managers can include, for example, a governance framework, key performance and quality indicators, and/or a workforce management plan. Also, artifacts for information technology (IT) enablement can include, for example, an application framework, a data schema design, monitoring probes, and/or one or more management dashboards. Further, physical artifacts can include, for example, one or more facilities (for example, fixed or capital), equipment needs (for example, capital), and/or product components (for example, consumable). Any of the artifacts can be extended, for example, by further automation and/or by human supervision.

Step 1408 includes incorporating the one or more artifacts into the service design and outputting the service (for example, to a user). The techniques depicted in FIG. 14 can also include collecting feedback from customers, users, infrastructure elements, and/or management. One or more embodiments of the invention can additionally include using the feedback to improve implementation of the service.

The techniques depicted in FIG. 14 can also, as described herein, include providing a system, wherein the system includes distinct software modules, each of the distinct software modules being embodied on a tangible computer-readable recordable storage medium. The distinct software modules can include, for example, an artifact generator module, a strategic function module, a marketing function module, an operations function module, a design parameters module and a SEW generation engine module executing on a hardware processor.

Additionally, the techniques depicted in FIG. 14 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 15:
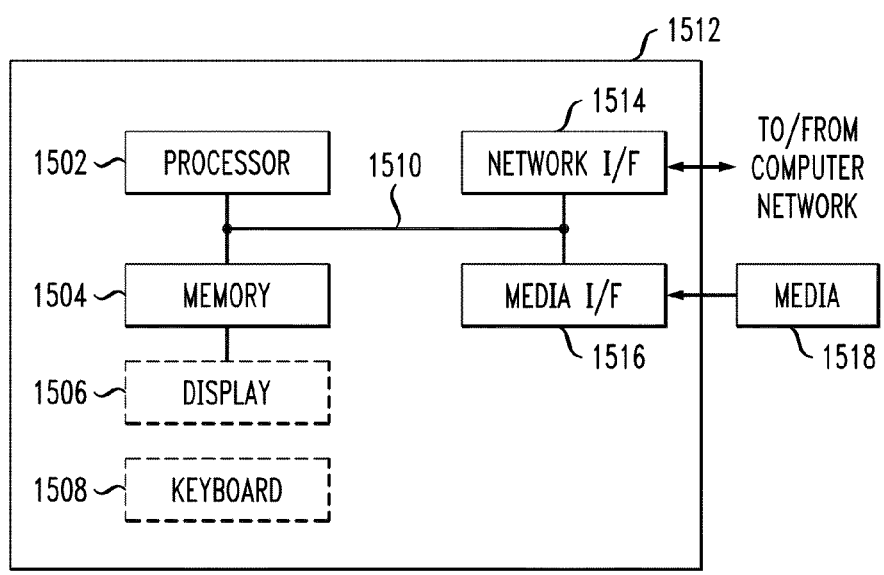
FIG. 15 is a system diagram of an exemplary computer system on which at least one embodiment of the invention can be implemented.

One or more embodiments can make use of software running on a general purpose computer or workstation. With reference to FIG. 15, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1502, memory 1504, and input/output interface such as display 1506 and keyboard 1508 can be interconnected, for example, via bus 1510 as part of a data processing unit 1512. Suitable interconnections, for example via bus 1510, can also be provided to a network interface 1514, such as a network card, which can be provided to interface with a computer network, and to a media interface 1516, such as a diskette or CD-ROM drive, which can be provided to interface with media 1518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1502 coupled directly or indirectly to memory elements 1504 through a system bus 1510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1512 as shown in FIG. 15) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding text herein. The method steps can then be carried out using the distinct software modules and/or sub-modules of the system, as described above, executing on one or more hardware processors 1502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, automatically generating artifacts of service design using an internal representation.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating one or more artifacts for service delivery, wherein the method comprises:
   receiving service design inputs comprising market environment information pertaining to users in a target market for the service, one or more objectives, one or more user needs, and one or more constraints;
   using the one or more service design inputs to generate an internal representation of the service design, wherein said generating the internal representation comprises:
      defining each of multiple actors to participate in delivery of the service, wherein said multiple actors comprise all humans necessary for completion of the service delivery;
      defining each of one or more activities of the service;
      mapping the multiple actors, the one or more objectives and the one or more constraints to each applicable activity of the one or more activities; and
      creating one or more task flows for the one or more activities;
   using the internal representation of the service to generate one or more artifacts of the service, wherein said using the internal representation of the service to generate said one or more artifacts comprises:

accessing a registry comprising (i) an artifact key of multiple artifacts and (ii) multiple artifact generator identifiers;

searching the registry to identify one or more desired artifact generator identifiers based on a requested artifact generator pertaining to the internal representation; and retrieving the one or more desired artifact generators corresponding to the one or more identified artifact generator identifiers from a collection of artifact generators; and incorporating the one or more artifacts into the service design and outputting the service.

2. The method of claim 1, wherein using the one or more service design inputs to generate an internal representation of the service design comprises using a service design tool to build the internal representation from the one or more service design inputs.

3. The method of claim 1, wherein using the internal representation of the service to generate one or more artifacts of the service comprises using a software tool to automatically generate the one or more artifacts of service design.

4. The method of claim 1, wherein incorporating the one or more artifacts into the service design and outputting the service comprises outputting the service to one or more users.

5. The method of claim 1, wherein the one or more artifacts of the service comprises at least one of one or more artifacts for customers, one or more artifacts for users, one or more artifacts for managers, one or more artifacts for information technology (IT) enablement and one or more physical artifacts.

6. The method of claim 5, wherein the one or more artifacts for customers comprise at least one of a service catalog, advertising material, a user guide for customers and one or more website templates.

7. The method of claim 5, wherein the one or more artifacts for users comprise at least one of one or more workflows, training material, and one or more online guides.

8. The method of claim 5, wherein the one or more artifacts for managers comprise at least one of a governance framework, key performance and quality indicators, and a workforce management plan.

9. The method of claim 5, wherein the one or more artifacts for information technology (IT) enablement comprise at least one of an application framework, a data schema design, one or more monitoring probes, and one or more management dashboards.

10. The method of claim 5, wherein the one or more physical artifacts comprise at least one of one or more facilities, one or more equipment needs, and one or more product components.

11. The method of claim 1, further comprising collecting feedback from at least one of one or more customers, one or more users, one or more infrastructure elements, and management.

12. The method of claim 11, further comprising using the feedback to improve implementation of the service.

13. The method of claim 1, further comprising providing a system, wherein the system comprises one or more distinct software modules, each of the one or more distinct software modules being embodied on a tangible computer-readable recordable storage medium, and wherein the one or more distinct software modules comprise an artifact generator module, a strategic function module, a marketing function module, an operations function module, a design parameters module and a service engineering workbench (SEW) generation engine module executing on a hardware processor.

14. A computer program product comprising a tangible non-transitory computer readable recordable storage medium including computer useable program code for generating one or more artifacts for service delivery, the computer program product including:

computer useable program code for receiving service design inputs comprising market environment information pertaining to users in a target market for the service, one or more objectives, one or more user needs, and one or more constraints;

computer useable program code for using the one or more service design inputs to generate an internal representation of the service design, wherein said generating the internal representation comprises:

defining each of multiple actors to participate in delivery of the service, wherein said multiple actors comprise all humans necessary for completion of the service delivery;

defining each of one or more activities of the service;

mapping the multiple actors, the one or more objectives and the one or more constraints to each applicable activity of the one or more activities; and creating one or more task flows for the one or more activities;

computer useable program code for using the internal representation of the service to generate one or more artifacts of the service, wherein said using the internal representation of the service to generate said one or more artifacts comprises:

accessing a registry comprising (i) an artifact key of multiple artifacts and (ii) multiple artifact generator identifiers;

searching the registry to identify one or more desired artifact generator identifiers based on a requested artifact generator pertaining to the internal representation; and retrieving the one or more desired artifact generators corresponding to the one or more identified artifact generator identifiers from a collection of artifact generators; and computer useable program code for incorporating the one or more artifacts into the service design and outputting the service.

15. The computer program product of claim 14, wherein the one or more artifacts of the service comprises at least one of one or more artifacts for customers, one or more artifacts for users, one or more artifacts for managers, one or more artifacts for information technology (IT) enablement and one or more physical artifacts.

16. The computer program product of claim 14, wherein the computer useable program code comprises one or more distinct software modules, and wherein the one or more distinct software modules comprise an artifact generator module, a strategic function module, a marketing function module, an operations function module, a design parameters module and a service engineering workbench (SEW) generation engine module executing on a hardware processor.

17. A system for generating one or more artifacts for service delivery, comprising:

a memory; and at least one processor coupled to the memory and operative to:

receive service design inputs comprising market environment information pertaining to users in a target market for the service, one or more objectives, one or more user needs, and one or more constraints;

use the one or more service design inputs to generate an internal representation of the service design, wherein said generating the internal representation comprises:
  defining each of multiple actors to participate in delivery of the service, wherein said multiple actors comprise all humans necessary for completion of the service delivery;
  defining each of one or more activities of the service;
  mapping the multiple actors, the one or more objectives and the one or more constraints to each applicable activity of the one or more activities; and
  creating one or more task flows for the one or more activities;
use the internal representation of the service to generate one or more artifacts of the service, wherein said using the internal representation of the service to generate said one or more artifacts comprises:
  accessing a registry comprising (i) an artifact key of multiple artifacts and (ii) multiple artifact generator identifiers;
  searching the registry to identify one or more desired artifact generator identifiers based on a requested artifact generator pertaining to the internal representation; and
  retrieving the one or more desired artifact generators corresponding to the one or more identified artifact generator identifiers from a collection of artifact generators; and
  incorporate the one or more artifacts into the service design and outputting the service.

18. The system of claim 17, wherein the one or more artifacts of the service comprises at least one of one or more artifacts for customers, one or more artifacts for users, one or more artifacts for managers, one or more artifacts for information technology (IT) enablement and one or more physical artifacts.

19. The system of claim 17, further comprising a tangible computer-readable recordable storage medium having one or more distinct software modules embodied thereon, wherein the one or more distinct software modules comprise an artifact generator module, a strategic function module, a marketing function module, an operations function module, a design parameters module and a service engineering workbench (SEW) generation engine module executing on a hardware processor.

* * * * *